US012773737B2

(12) United States Patent
Gerstenberger

(10) Patent No.: US 12,773,737 B2
(45) Date of Patent: Oct. 27, 2026

(54) EXPANSION CLAMPING DEVICE AND METHOD FOR PRODUCING SAME

(71) Applicant: MAPAL Fabrik für Präzisionswerkzeuge Dr. Kress KG, Aalen (DE)

(72) Inventor: Ralf Gerstenberger, Sehmatal Neudorf (DE)

(73) Assignee: MAPAL Dr. Kress SE & Co. KG, Aalen (DE)

( * ) Notice: Subject to any disclaimer, the term of this patent is extended or adjusted under 35 U.S.C. 154(b) by 748 days.

(21) Appl. No.: 18/018,607

(22) PCT Filed: Jul. 29, 2021

(86) PCT No.: PCT/EP2021/071348
§ 371 (c)(1),
(2) Date: Jan. 30, 2023

(87) PCT Pub. No.: WO2022/023504
PCT Pub. Date: Feb. 3, 2022

(65) Prior Publication Data
US 2023/0302548 A1 Sep. 28, 2023

(30) Foreign Application Priority Data
Jul. 30, 2020 (DE) ..................... 10 2020 209 659.7

(51) Int. Cl.
*B23B 31/30* (2006.01)

(52) U.S. Cl.
CPC ........ *B23B 31/305* (2013.01); *B23B 2240/08* (2013.01)

(58) Field of Classification Search
CPC .............. B23B 31/1178; B23B 31/305; B23B 2240/08
See application file for complete search history.

(56) References Cited

U.S. PATENT DOCUMENTS 9,289,831 B2 * 3/2016 Herud .................. B23B 31/305
9,676,040 B2 6/2017 Doi
(Continued)

FOREIGN PATENT DOCUMENTS

DE 29603751 U1 6/1996
DE 20023140 U1 1/2003
(Continued)

OTHER PUBLICATIONS

International Search Report (English and German) and Written Opinion of the International Searching Authority (German) issued in PCT/EP2021/071348, mailed Date; ISA/EP.
(Continued)

*Primary Examiner* — Eric A. Gates
(74) *Attorney, Agent, or Firm* — Harness, Dickey & Pierce, P.L.C.; Stephen T. Olson

(57) ABSTRACT

An expansion clamping device includes a base body and an expansion socket. The expansion socket is inserted into the base body to form a pressure chamber appliable with a hydraulic medium while elastically deforming the expansion socket to achieve a clamping effect in a receiving space open in an axial direction of the base body towards a face side and is surrounded by the expansion socket in a circumferential direction. The expansion socket has an elastically deformable clamping section and a collar. The clamping section transitions into the collar in a transition region, a recess being formed in the expansion socket in the transition region such that the transition region overlaps over the contact shoulder of the base body in regions, the bearing surface of the expansion socket bearing against the contact surface in a radially outer contact region thereof, and the contact surface having a radially inner free region adjacent to the contact region, in which free region the expansion socket does not bear against the contact surface.

23 Claims, 7 Drawing Sheets

(56) References Cited

U.S. PATENT DOCUMENTS

Figure 1:
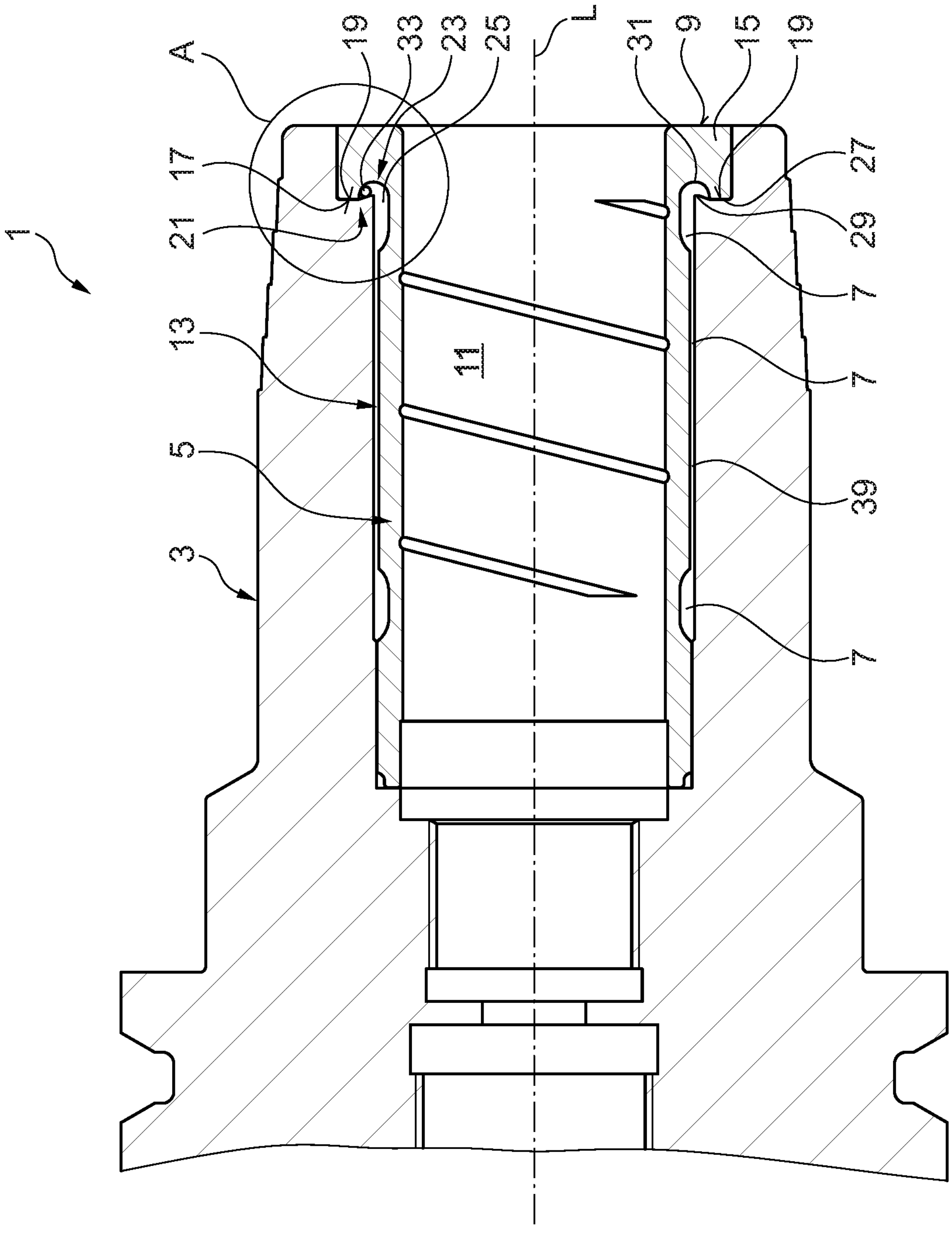

| | | | |
|---|---|---|---|
| 9,839,964 | B2 | 12/2017 | Herud |
| 10,160,042 | B2 * | 12/2018 | Borapura .............. B23B 31/102 |
| 2008/0179838 | A1 | 7/2008 | Retzbach et al. |
| 2015/0360296 | A1 | 12/2015 | Herud |
| 2016/0031015 | A1 | 2/2016 | Doi |

FOREIGN PATENT DOCUMENTS

| | | | | |
|---|---|---|---|---|
| DE | 102005043823 | A1 * | 3/2007 | ........... B23B 31/305 |
| EP | 2177296 | A1 | 4/2010 | |
| WO | WO-2009092365 | A1 * | 7/2009 | ........... B23B 31/305 |

OTHER PUBLICATIONS

Chinese Office Action pertaining to Chinese Application No. 202180053768.3, dated Aug. 6, 2025 (with translation).

* cited by examiner

EXPANSION CLAMPING DEVICE AND METHOD FOR PRODUCING SAME

CROSS REFERENCE TO RELATED APPLICATIONS

This application is a U.S. National Phase Application under 35 U.S.C. 371 of International Application No. PCT/EP2021/071348, filed on Jul. 29, 2021, which claims priority to German Patent Application No. 10 2020 209 659.7, filed on Jul. 30, 2020. The entire disclosures of the above applications are expressly incorporated by reference herein.

The invention relates to an expansion clamping device and a method for its manufacture.

DE 200 23 140 U1 shows an expansion clamping device which has a base body and an expansion socket inserted into the base body to form a pressure chamber. The pressure chamber can be applied with a hydraulic medium while elastically deforming the expansion socket in order to achieve a clamping effect in a receiving space which is open in the axial direction of the base body towards one face side and is surrounded by the expansion socket in the circumferential direction. The expansion socket has an elastically deformable clamping section and a collar projecting outward in the radial direction on the face side. It rests with a bearing surface of the collar in the axial direction against a contact surface of a contact shoulder of the base body and is brazed to the base body at its axial end regions. The contact shoulder of the base body has a step so that an annular groove is formed in which the expansion socket engages positively with a corresponding annular web. Both the bearing surface of the collar of the expansion socket and the contact surface of the bearing shoulder of the base body are thus divided into two steps, the bearing surface being in contact with the bearing surface everywhere along its extension. In particular, a contact region in which the bearing surface rests against the contact surface extends radially inwards towards the pressure chamber.

With such an expansion clamping device, there is basically the problem that the pressure forces introduced into the pressure chamber via the hydraulic medium to achieve the clamping effect are converted by the corresponding deformation within the expansion socket into tensile forces which destabilize the soldered joint between the expansion socket and the base body, in particular creating a notch effect in the contact region which places a high load on the soldered joint and over time, in particular over a plurality of stress cycles, can lead to reduced strength of the joint and ultimately even to failure of the expansion clamping device. In order to nevertheless be able to ensure sufficient stability of the expansion clamping device, a comparatively large axial distance is required between an axially outermost face of the expansion clamping device and an end of the pressure chamber axially facing the face side, so that the clamping effect on a tool inserted into the receiving space can only begin axially comparatively far back, i.e. away from the face side, on a tool shank of the tool. This in turn leads to reduced stability of the connection between the expansion clamping device and the tool. Finally, it proves difficult in practice, and thus not least costly, to establish the firm, in particular material-locking connection of the expansion socket to the base body.

The invention is based on the task of creating an expansion clamping device and a method for its manufacture, whereby the disadvantages mentioned are at least partially alleviated, preferably avoided.

The task is solved by providing the present technical teaching, in particular the teaching of the independent claims as well as the embodiments disclosed in the dependent claims and the description.

The task is solved in particular by further forming an expansion clamping device in such a way that the clamping section transitions into the collar in a transition region, wherein a recess is formed in the expansion socket in the transition region in such a way that the transition region covers the contact shoulder of the base body, in particular the contact surface, in regions, the bearing surface of the expansion socket bearing against the contact surface in a radially outer contact region of the latter, and the contact surface having a radially inner free region which adjoins the contact region and in which the expansion socket does not bear against the contact surface. At least in the region of the contact surface, the expansion socket is firmly connected, in particular by a material bond, to the base body. The fact that the transition region overlaps the contact shoulder of the base body in regions, with the bearing surface only resting against the contact surface in the radially outer contact region, with the radially inner free region remaining on the contact surface where the expansion socket, in particular the bearing surface, does not rest against the contact surface, advantageously provides in particular a low-stress geometry. In particular, compressive forces formed in the hydraulic chamber by means of the hydraulic medium are no longer converted into tensile forces within the expansion socket, but rather into compressive forces in the transition region, which apply a contact pressure to the contact region and press the bearing surface against the contact surface. Thus, advantageously, the firm, in particular materially bonded connection between the expansion socket and the base body in the contact region is not destabilized by a pressure built up in the pressure chamber, but rather preferably even stabilized, with the compressive strength and fatigue strength of the expansion clamping device being increased. At the same time, notch effects are avoided. A self-help design is provided, as it were, for the connection between the expansion socket and the base body. Since the expansion clamping device is quasi intrinsically stabilized in this way, an axial distance between the axially outermost face of the expansion clamping device and the end of the pressure chamber facing axially towards the face side, i.e. the face side end, can be advantageously reduced so that a tool shank inserted into the receiving space can be clamped axially further forward. This also advantageously improves the clamping properties of the expansion clamping device, and the connection of the expansion clamping device to the tool is stabilized.

The geometry of the expansion clamping device, in particular the geometry of the expansion socket, is preferably optimized by means of the finite element method, in particular with regard to the force flow.

In particular, the expansion clamping device is set up to clamp, in particular fix, the tool shank of a tool, for example a drill shank or a milling cutter shank. In particular, the expansion clamping device is preferably set up to fix the tool shank in a work spindle of a machine tool. The expansion clamping device can be directly associated with the machine tool or be part of the machine tool. However, it can also be designed as a separate device which in turn can be connected—indirectly or directly—to a machine tool, in particular can be clamped in a machine tool. In particular, the expansion clamping device can be designed as an adapter.

In particular, the expansion clamping device is designed as a chuck.

If a hydraulic medium, in particular hydraulic oil, arranged in the pressure chamber is pressurized, the expansion socket deforms radially inwards into the receiving space, in particular in the clamping section, so that a tool shank arranged in the receiving space can be firmly clamped.

The pressure chamber is preferably bounded at least in regions by the base body and the expansion socket. In particular, the pressure chamber is preferably designed as an annular space which is bounded by the base body on the one hand and the expansion socket inserted in the base body on the other.

The expansion clamping device is in particular a part which is different from the base body, is separate from the base body before it is firmly connected to the latter, and is firmly, in particular materially, connected to the base body in the course of the manufacture of the expansion device.

In particular, the expansion socket is inserted into the base body on the face side. In particular, the expansion socket is inserted into the base body in such a way that a face side of the expansion socket and the face side of the base body are radially aligned, i.e. at the same axial height. In particular, the expansion socket has a first outer diameter of an outer peripheral surface of the collar that is smaller than a second outer diameter of an outer peripheral surface of the base body in the region of the face side of the base body.

It is possible for the expansion socket to have a bottom which limits the receiving space opposite the face side in the axial direction. The expansion socket is then preferably also firmly connected, in particular by a material bond, to the base body in the region of the base. Alternatively, it is possible for the expansion socket to be open axially on both sides. In this case, too, however, the expansion socket is preferably fastened to the base body on the end side axially opposite the face side, in particular connected to the base body by a material bond.

In particular, the clamping section is formed integrally with the collar. In particular, the expansion socket is preferably formed in one piece, in particular in one material.

Preferably, the clamping section transitions into the collar via a contour that is rounded off at least in regions.

The axial direction, also referred to as the axial direction, is preferably a direction of longest extension, i.e. longitudinal axis, of the base body or expansion socket, and/or a direction along which a tool shank can be introduced into the receiving space via the face side. Preferably, the expansion socket is rotationally symmetrical, with the axial direction coinciding with an axis of symmetry of the rotationally symmetrical expansion socket. In a preferred embodiment, the expansion clamping device is designed to be rotationally symmetrical as a whole. The radial direction is perpendicular to the axial direction. A circumferential direction concentrically embraces the axial direction.

In particular, "radially inward" is understood to mean an orientation or alignment toward the longitudinal axis or axis of symmetry of the expansion socket, while "radially outward" is understood to mean an opposite orientation or alignment away from the longitudinal axis or axis of symmetry. Thus, a radially outer region is located further away from the longitudinal axis or axis of symmetry in the radial direction than a radially inner region.

The face side is in particular the side that is intended to face a tool to be inserted into the receiving space.

In the free region, the contact surface in particular has no contact with the expansion socket. In particular, the contact surface in the free region is arched over by the transition region, in particular by the recess, preferably by a contour of the recess which is rounded off at least in regions.

The free region is in particular arranged at the same axial height as the contact region at least where it adjoins the contact region. This means in particular that the free region is not arranged offset in axial direction relative to the contact region, at least where it adjoins the contact region, preferably rather being aligned with the contact region or at least transitioning smoothly into it. In particular, the contact surface has no axial step, especially no axial offset, between the contact region and the free region.

The free region can be used advantageously to arrange a connecting element, in particular a—preferably O-ring-shaped—solder ring, on the contact surface, preferably in the immediate vicinity of the bearing surface, in particular adjacent to the contact region, during manufacture of the expansion clamping device. In this way, the connection between the expansion socket and the base body can be effected in a simple, time-saving and, in particular, cost-effective manner. In addition, it is also advantageously possible to dispense with solder depot punctures, which would otherwise lead to a weakening of the expansion clamping device.

In particular, the clamping section has a first partial clamping section and a second partial clamping section. In particular, the first partial tensioning section is further away from the face side of the expansion socket than the second partial tensioning section, as viewed in the axial direction.

In particular, the expansion socket has a first wall thickness in the transition region that is different from a second wall thickness that the expansion socket has in the second partial tensioning section. In particular, the first wall thickness is measured in the axial direction, with the second wall thickness being measured in the radial direction. Preferably, the first wall thickness is greater than the second wall thickness, preferably by a factor of at least 3.6 to at most 4.3.

In particular, the expansion socket has a third wall thickness in the region of the collar. In particular, the third wall thickness is a radial extension between an inner peripheral surface of the receiving space and the outer peripheral surface of the collar. In particular, the third wall thickness is half the difference between the first outer diameter of the outer peripheral surface of the collar and an inner diameter of the inner peripheral surface of the receiving space. In particular, the third wall thickness is different from the second wall thickness. Preferably, the third wall thickness is greater than the second wall thickness, preferably by a factor of at least 3.3 to at most 4.8.

In a first embodiment, the third wall thickness is greater than the second wall thickness by a factor of at least 3.3 to at most 3.9. In particular, the third wall thickness in the first embodiment is smaller than the first wall thickness. Preferably, the inner peripheral surface of the receiving space in the first embodiment has an inner diameter of at least 6 mm to at most 18 mm.

In a second embodiment, the third wall thickness is larger than the second wall thickness by a factor of at least 4.2 to at most 4.8. In particular, the third wall thickness in the second embodiment is greater than the first wall thickness. Preferably, in the second embodiment, the inner peripheral surface of the receiving space has an inner diameter of at least 20 mm to at most 32 mm.

In particular, in a first embodiment, the first wall thickness is greater than the third wall thickness. Preferably, in the first embodiment, the inner peripheral surface of the receiving space has an inner diameter of at least 6 mm to at most 18 mm. In particular, in a second embodiment, the third wall thickness is greater than the first wall thickness. Preferably, in the second embodiment, the inner peripheral surface of the receiving space has an inner diameter of at least 20 mm to at most 32 mm.

In particular, the expansion socket has a fourth wall thickness in the first partial clamping section. In particular, the fourth wall thickness is measured in the radial direction. In particular, the fourth wall thickness is different from the second wall thickness. Preferably, the fourth wall thickness is greater than the second wall thickness, preferably by a factor of at least 1.6 to at most 2.0.

In particular, the first wall thickness is greater than the fourth wall thickness. In particular, the third wall thickness is greater than the fourth wall thickness.

According to a further development of the invention, it is provided that the contact surface has an elevation in the free region. The elevation extends in particular axially in the direction of the face side. Advantageously, the elevation can be used in the manufacture of the expansion clamping device to hold the connecting element on the contact surface, in particular in the immediate vicinity of the contact region. Advantageously, the elevation further permits process-reliable control of the flow behavior of connecting material of the connecting element when the latter is made flowable, in particular liquefied, during production of the connection between the expansion socket and the base body, in particular when the connecting element is designed as a solder ring. In a particularly advantageous manner, the connecting material, in particular solder, can be prevented from running into undesirable areas, such as a hydraulic gap in the pressure chamber.

The hydraulic gap is understood in particular to be an area of the clamping section in which a width of the pressure chamber measured in the radial direction is minimal but different from zero.

According to a preferred embodiment, the elevation is spaced from the bearing surface—in the radial direction. In this case, the connecting element can be arranged between the bearing surface and the elevation in a particularly advantageous manner.

However, it is also possible for the elevation to begin directly where the contact region adjoins the free region, in which case—as explained above—preferably no step is formed there, but rather the elevation begins gradually, in particular in the form of a ramp rising radially inward toward the face side. Even with this geometry of the elevation, the connecting element can be arranged safely and stably in the free region, in particular in the immediate vicinity of the contact region.

According to a further development of the invention, the elevation is designed as a ramp rising radially inwards towards the face side. In particular, this enables a particularly stable arrangement of the connecting element on the free region, while at the same time positively influencing the flow behavior of the flowable connecting material into the contact region.

Alternatively, it is preferably provided that the elevation is formed as a protrusion projecting—in axial direction—towards the face side. In particular, the elevation is preferably designed as a protrusion projecting perpendicularly to the face side. This design enables a particularly stable and secure arrangement of the connecting element in the free region. The protrusion is preferably formed at a radially inner end of the free region, thus in particular delimiting the free region towards the pressure chamber.

According to a further development of the invention, it is provided that the elevation is arranged at a radially inner end of the free region. This enables a particularly secure and stable arrangement of the connecting element between the contact region and the elevation. The protrusion, in particular the protrusion, preferably has the effect of forming a type of annular groove in the free region radially on the inside between the contact region and the elevation, in which the connecting element can be arranged in a secure and stable manner. At the same time, the elevation advantageously limits the flow behavior of the liquefied connecting material and, in particular, prevents its penetration into the hydraulic gap.

According to a further development of the invention, it is provided that the pressure chamber is widened radially inwards in the region of the recess. In this way, space is advantageously created for a low-notch geometry of the pressure chamber, in particular in the form of enlarged radius of curvature. At the same time, the pressure chamber can have a small width in the region of the clamping section, in particular in the region of the hydraulic gap, so that only a small amount of hydraulic medium is required to fill the pressure chamber.

In a preferred embodiment, the pressure chamber in the area of the recess is widened to at least twice the gap width of the hydraulic gap formed in the clamping section. In this way in particular, a geometry with a low notch effect can be provided in the region of the recess while at the same time maintaining a narrow hydraulic gap.

According to a further development of the invention, it is provided that the recess has a first region in the axial direction, which is associated with the collar, and a second region, which is associated with the clamping section. The first region and the second region are in particular offset from one another in the axial direction, it being possible for them to be directly adjacent to one another. The first region preferably extends in axial direction away from the face side to an end of the collar; the second region preferably adjoins the first region. A width of the recess measured in the radial direction is at least twice as large in the first region as in the second region. In particular, this makes it possible to design a low-notch geometry and to design the transition region in such a way that it overlaps the free region.

According to a further development of the invention, it is provided that the transition region has a contour in longitudinal section which is rounded at least in regions. A longitudinal section is understood in particular as a view in a plane in which the longitudinal axis lies. In particular, the recess in the longitudinal section has the contour which is rounded at least in regions. Advantageously, the rounded contour in particular causes the expansion socket to have a geometry with low stress and in particular low notch effect in the transition region.

In particular, the contour is determined by a boundary line of the recess which can be seen in the longitudinal section plane.

Preferably, a curvature radius of the contour in the rounded region, that is, in the region in which the contour is rounded, is at least 0.5 mm, preferably from at least 0.5 mm to at most 2 mm, preferably to at most 1.5 mm. In particular, these radii of curvature ensure a particularly low-notch geometry of the transition region.

The curvature radius is preferably at least half of a width of the pressure chamber measured in the radial direction, in particular the width of the hydraulic gap. Particularly preferably, the curvature radius is at least half of a width of the recess measured in the radial direction. This applies in a preferred manner to all the radii of curvature or radii mentioned below.

According to a further development of the invention, it is provided that the contour of the transition region, in particular of the recess, has a constant curvature radius throughout. The contour is thus rounded, in particular along its entire extent, and has the same finite, i.e. non-zero, curvature radius everywhere. This makes it possible to avoid pointed or angular geometries and thus stress peaks and notch effects in a particularly effective manner.

According to a further development of the invention, it is provided that the contour of the transition region, in particular of the recess, has a first section, which is associated with the collar and extends from the bearing surface, and which is rectilinear in the axial direction. The contour also has a second section associated with the clamping section, which is also rectilinear in the axial direction. Accordingly, the first section and the second section are oriented in particular parallel to one another and offset from one another in the radial direction. In particular, the first section associated with the collar is arranged radially further out than the second section associated with the clamping section. In particular, the second section transitions into the clamping section, the first section preferably transitioning into the collar or being part of the collar. The first section transitions into the second section via a third section. In particular, the third section thereby connects the first section to the second section.

According to a first embodiment, the third section has a curvature radius, in particular a finite, i.e. non-zero, curvature radius. In this way, too, a geometry with low notch effect can be ensured. In a preferred embodiment, the third section has a constant, in particular finite, curvature radius.

According to an alternative second embodiment, the third section is rectilinear in the radial direction, with the first section transitioning into the third section via a first, in particular finite, curvature radius. The third section, in turn, transitions into the second section via a second, in particular finite, curvature radius. The first section and the second section are thus spaced apart from one another, in particular by a region which is straight in the radial direction, namely the third section, the transition from the first section into the third section and from the third section into the second section in each case being rounded, with the first radius of curvature on the one hand and with the second radius of curvature on the other. This also represents a geometry with low stress and notch effects.

According to a preferred embodiment, it is possible that the first curvature radius and the second curvature radius are the same. However, according to another preferred embodiment, it is also possible that the first curvature radius is different from the second curvature radius.

According to a further embodiment of the invention, it is provided that the first section of the contour transitions into the second section via the third section, wherein the first section, however, is not formed rectilinearly, but rather has a third, in particular finite, preferably constant radius of curvature, wherein the third section is formed rectilinearly in the radial direction, and wherein the third section transitions into the second section via a second, in particular finite radius of curvature. In this way, advantageously low-stress and low-notch geometries can be provided. It is possible that the third curvature radius and the second curvature radius are the same. It is also possible that the third curvature radius and the second curvature radius are different from each other. Also, the third radius of curvature may be the same as or different from the aforementioned first radius of curvature.

Finally, according to a further development of the invention, it is provided that the expansion socket is soldered to the base body at least in the region of the bearing surface. This represents a particularly simple and inexpensive way of effecting a firm, substance-to-substance connection between the expansion socket and the base body.

The task is also solved by creating a method for producing an expansion clamping device, in particular the expansion clamping device according to the invention or an expansion clamping device according to one of the embodiments described above, wherein an expansion socket is inserted into a base body to form a pressure chamber, wherein within the scope of the method an expansion socket is used which has an elastically deformable clamping section and a collar projecting outwardly in the radial direction at the face side, wherein the clamping section transitions into the collar in a transition region, and wherein a recess is formed in the expansion socket in the transition region. The expansion socket is placed with a bearing surface of the collar in axial direction against a contact surface of a contact shoulder of the base body, so that the transition region overlaps the contact shoulder of the base body in regions. The bearing surface of the expansion socket is placed against the bearing surface in a radially outer contact region of the bearing surface, whereby a radially inner free region adjacent to the contact region is formed on the bearing surface. In this free region, the expansion socket does not lie against the contact surface. A connecting element is arranged on the contact surface in the free region, and the expansion socket is firmly connected, in particular by material bonding, to the base body at least in the region of the bearing surface by means of the connecting element. In particular, an expansion clamping device according to the invention or an expansion clamping device according to one of the previously described embodiments is obtained. In this way, an expansion clamping device with high compressive strength and fatigue strength can be produced in a particularly advantageous, simple, cost-effective and process-reliable manner. In other respects, too, the advantages already explained in connection with the expansion clamping device are preferably realized in connection with the process.

According to a further development of the invention, it is provided that the base body, the expansion socket and the connecting element are heated in order to effect the connection of the expansion socket to the base body by means of the connecting element. In particular, the base body, the expansion socket and the connecting element are preferably introduced into an oven in the configured arrangement described above, that is, with the expansion socket inserted into the base body and the connecting element arranged in the free region on the contact surface, and heated in the oven. Heating preferably makes the connecting element flowable, in particular liquefies it, whereby it penetrates—preferably by capillary action—into the contact region between the bearing surface and the base body, where it produces a firm, material-locking connection between the expansion socket and the base body. This represents an equally simple and process-safe design of the process. Preferably, care is taken to ensure suitable orientation when introducing the assembly comprising the base body, the expansion socket and the connecting element into the furnace. Preferably, a so-called charging frame is used for this purpose, in particular a charging frame made of fiber-reinforced plastic, in particular carbon fiber-reinforced plastic.

In a preferred embodiment, the expansion socket is soldered, in particular brazed, to the base body.

According to a further development of the invention, it is provided that a solder ring is used as the connecting element. This represents a particularly simple, cost-effective and process-reliable embodiment of the method. In particular, the solder ring can be arranged in the free region on the contact surface in a simple and reliable manner. In particular, the advantages already explained in connection with the expansion clamping device are realized in the process.

Figure 3:
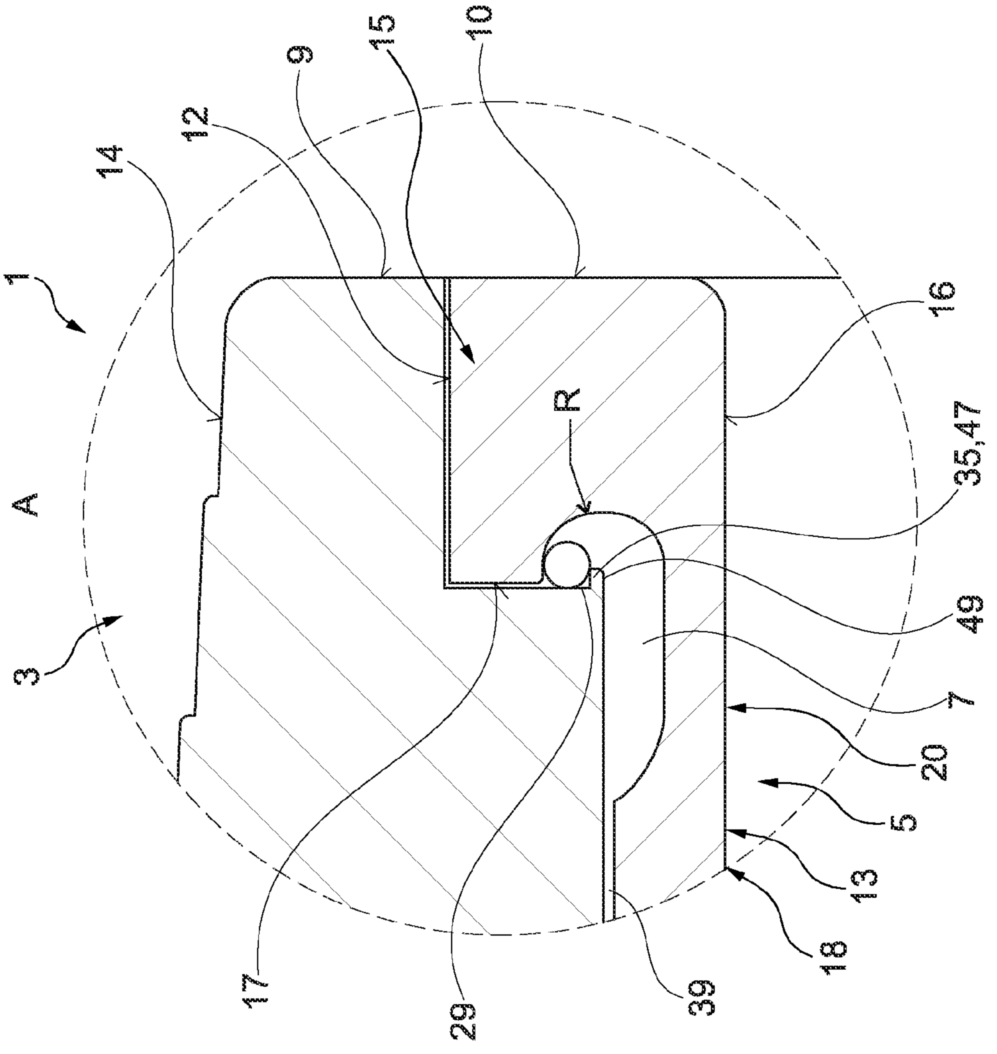
Figure 4:
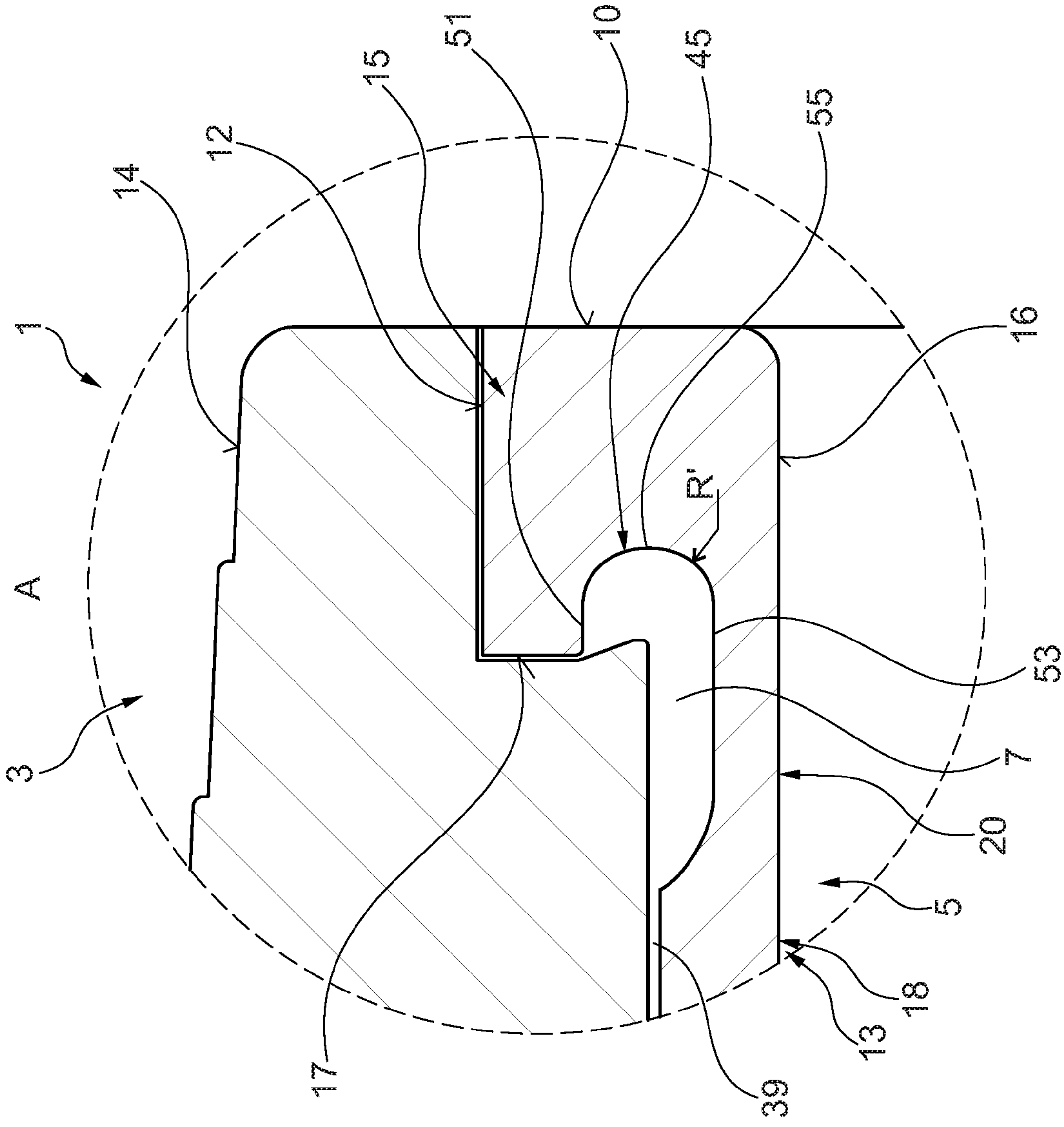
Figure 5:
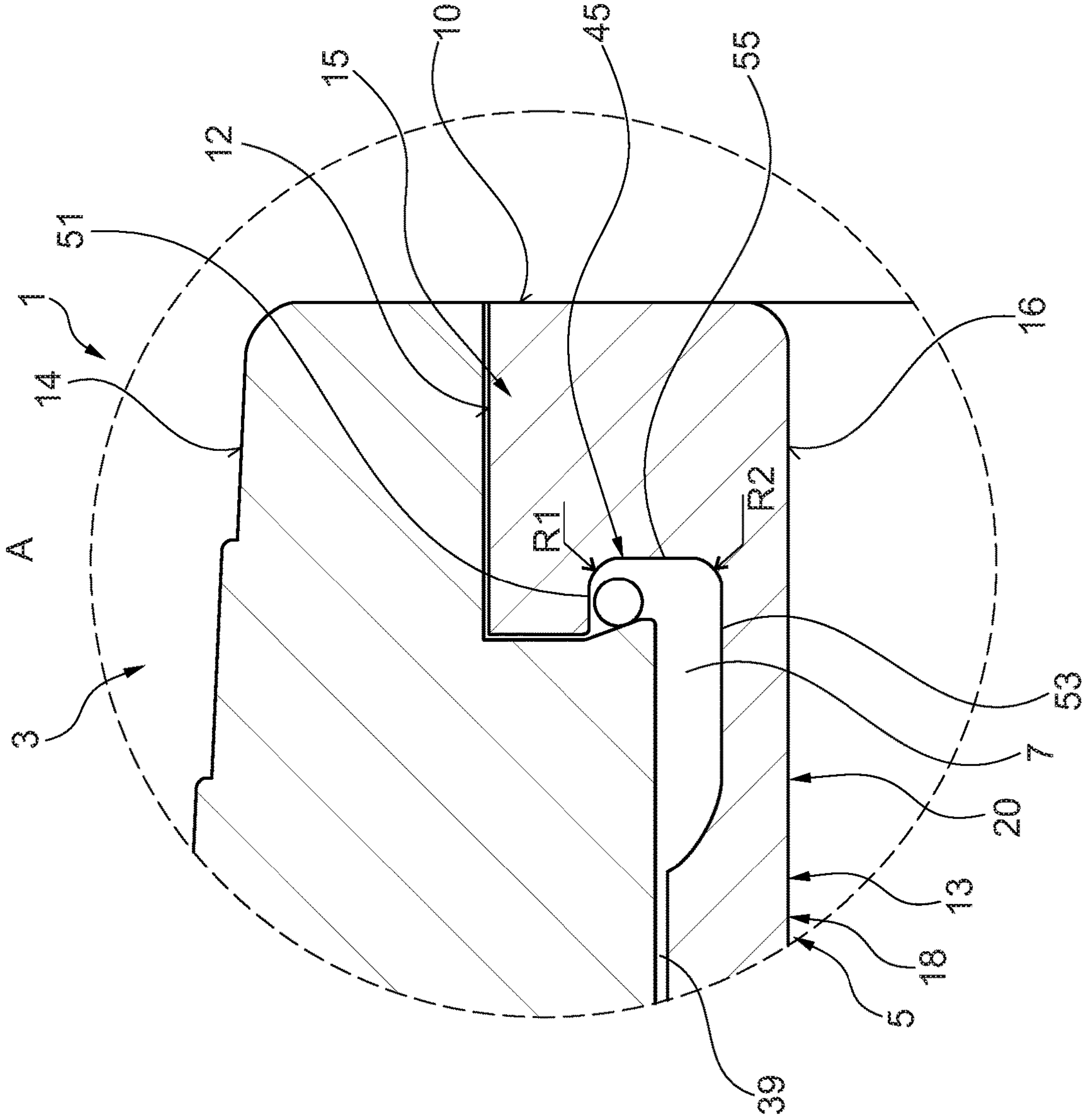
Figure 6:
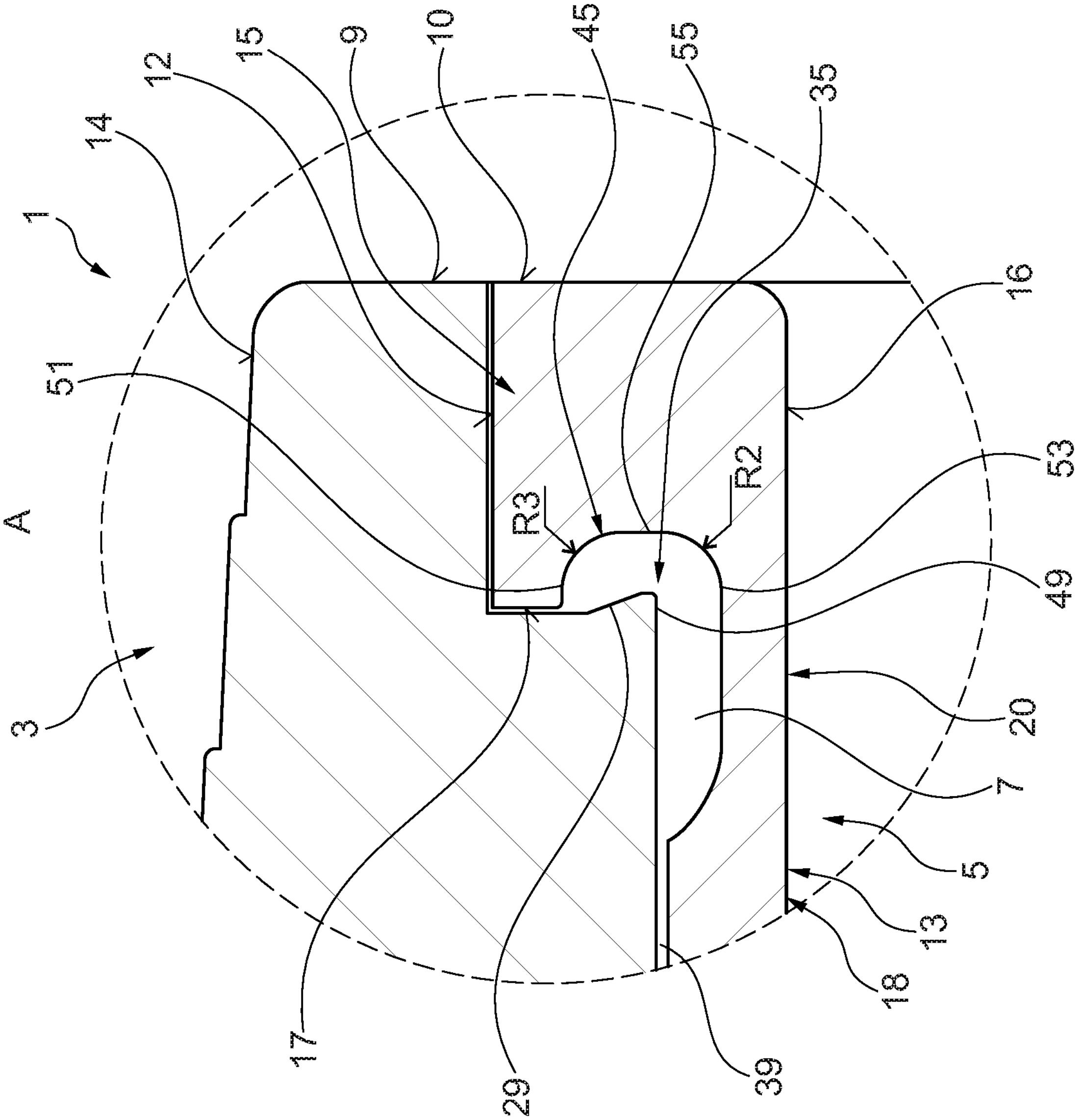

The invention is explained in more detail below with reference to the drawing. Thereby show:

FIG. 1 a schematic longitudinal sectional view of a first embodiment of an expansion clamping device;

FIG. 2 a detailed view of the first embodiment according to FIG. 1;

FIG. 3 a detailed view of a second embodiment of the expansion clamping device;

FIG. 4 a detailed view of a third embodiment of the expansion clamping device;

FIG. 5 a detailed view of a fourth embodiment of the expansion clamping device, and FIG. 6 a detailed view of a fifth embodiment of the expansion clamping device.

FIG. 1 shows a schematic longitudinal sectional view of a first embodiment of an expansion clamping device 1. The expansion clamping device 1 has a base body 3 and an expansion socket 5. The expansion socket 5 is inserted into the base body 3 to form a pressure chamber 7, wherein the pressure chamber 7 can be applied with a hydraulic medium, in particular a hydraulic oil, with elastic deformation of the expansion socket 5, in order to achieve a clamping effect in a receiving space 11 which is open in the axial direction, that is in the direction of a longitudinal axis L of the base body 3, towards a face side 9 and is circumferentially enclosed by the expansion socket 5. The mode of operation of such an expansion clamping device 1, in particular an expansion bushing, is known in principle, so that it will not be discussed in detail here.

The longitudinal axis L of the base body 3 is at the same time the longitudinal axis L of the expansion socket 5 and at the same time also an axis of symmetry of the expansion socket 5, which is rotationally symmetrical in this respect. It is possible for the base body 3 also to be rotationally symmetrical about the longitudinal axis L.

In the receiving space 11, a tool shank of a tool not shown here can be received and clamped by means of the expansion socket 5 elastically deformed by hydraulic pressure. In a preferred embodiment, the expansion clamping device 1 itself can be non-rotatably connected to a machine spindle of a machine tool. Alternatively, it is possible for the expansion clamping device 1 itself to be part of such a machine spindle.

The expansion socket 5 has an elastically deformable clamping section 13 and a collar 15 projecting outwardly in the radial direction at the face side.

The expansion socket 5 rests with a bearing surface 17 of the collar 15 in axial direction against a contact surface 19 of a bearing shoulder 21 of the base body 3, and at least in the region of the bearing surface 17 is firmly, in particular materially, connected, preferably soldered, preferably brazed, to the base body 3.

The clamping section 13 transitions into the collar 15 in a transition region 23, a recess 25 being formed in the expansion socket 5 in the transition region 23 in such a way that the transition region 23 engages in regions over the contact shoulder 21 of the base body 3, in particular the contact surface 19. The bearing surface 17 is in contact with the contact surface 19 in a radially outer contact region 27 of the contact surface 19. The contact surface 19 has a radially inner free region 29 adjacent to the contact region 27, in which the expansion socket 5, in particular the bearing surface 17, does not bear against the contact surface 19.

Thus, in particular, a geometry with low stress and notch effects is provided, whereby advantageously pressure forces formed in the pressure chamber 7 are deflected within the expansion socket 5 in such a way that, when the pressure chamber 7 is pressurized, the contact region 27 is subjected to pressure forces which urge the bearing surface 17 against the contact surface 19 and thereby stabilize the firm, in particular by a material bond connection between the expansion socket 5 and the base body 3. This advantageously increases the compressive strength and fatigue strength of the expansion clamping device 1.

In particular, as a result of this stabilization, a distance measured in the axial direction between the face side 9 and an axial, face-side end 31 of the pressure chamber 7 can be shortened in comparison with conventional embodiments, so that a tool shank inserted into the receiving space 11 is clamped relatively far forward within the receiving space 11, that is to say toward the face side 9.

Last but not least, this also stabilizes the connection between the expansion clamping device 1 and the tool.

FIG. 1 shows schematically that a connecting element 33, in particular a solder ring, can be arranged in the free region 29 on the contact surface 19 in order to connect the expansion socket 5 firmly, in particular materially, to the base body 3 in a simple, cost-effective and reliable manner during the manufacture of the expansion clamping device 1.

In FIG. 1, a detail of the expansion clamping device 1 is marked A.

Figure 2A:
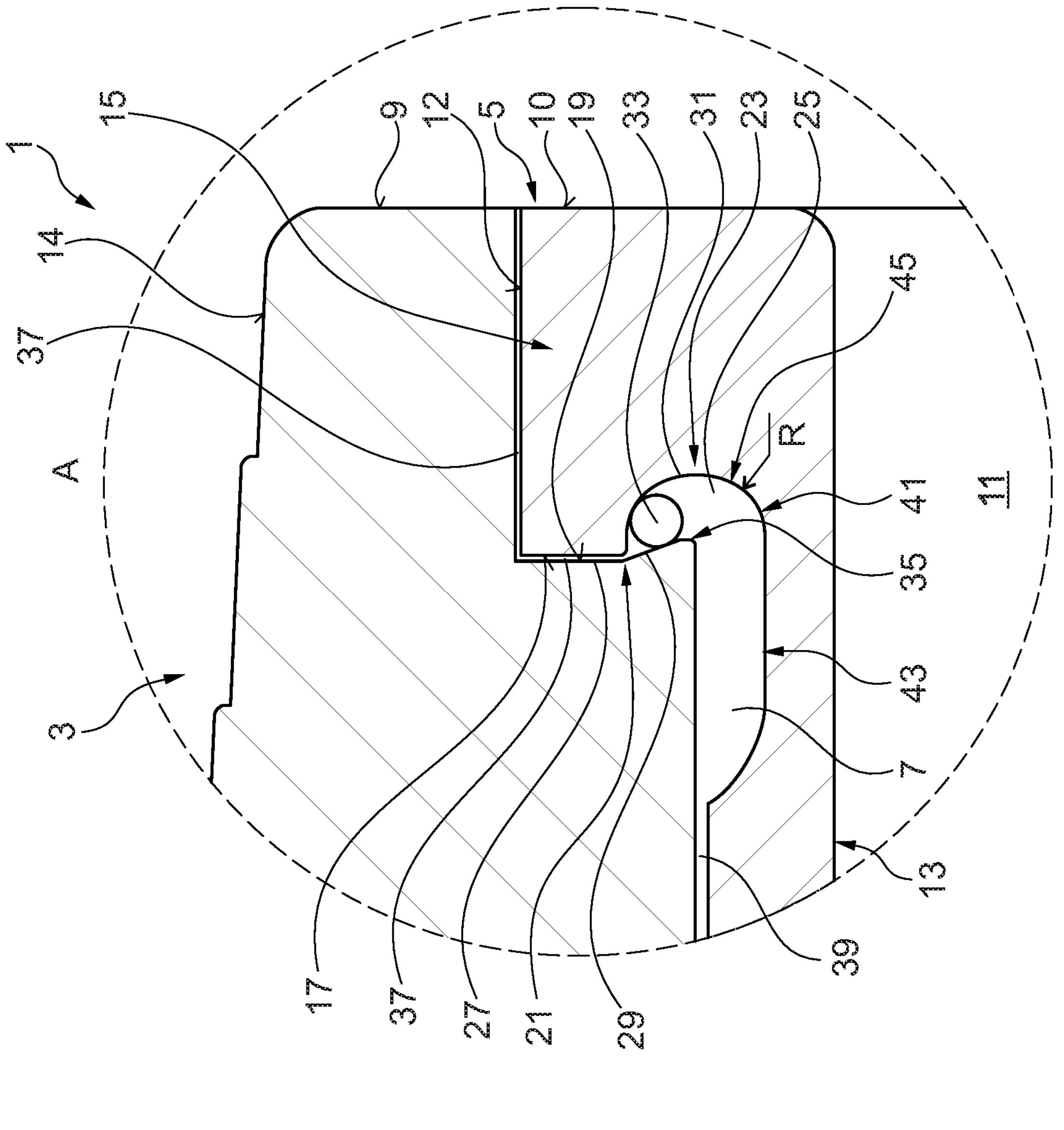

FIG. 2*a* shows an enlarged representation of this detail A. Identical and functionally identical elements are provided with the same reference signs in all figures, so that in this respect reference is made in each case to the preceding description.

Particularly preferably, the expansion socket 5 is inserted into the face side of the base body 3. Preferably, the expansion socket 5 is inserted into the base body 3 in such a way that one face side 10 of the expansion socket 5 and the face side 9 of the base body 3 are radially aligned, i.e. at the same axial height. Preferably, the expansion socket 5 has a first outer diameter of an outer peripheral surface 12 of the collar 15 which is smaller than a second outer diameter of an outer peripheral surface 14 of the base body 3 in the region of the face side 9 of the base body 3.

The contact surface 19 preferably has an elevation 35 in the free region 29. The elevation 35 is formed here as a ramp rising radially inwardly toward the face side 9. The elevation 35 advantageously serves for positioning, preferably also fixing, the connecting element 33, as well as for the process-reliable control of a flow behavior of a connecting material of the connecting element 33 liquefied during the connection of the base body 3 with the expansion socket 5. This flows thereby preferably, in particular by capillary action, into gaps 37 necessarily remaining between the expansion socket 5 and the base body 3 and thus effects the firm, material-locking connection of these parts to one another. The elevation 35 thereby advantageously prevents in particular the flowable connecting material from penetrating into the pressure chamber 7 and in particular into a hydraulic gap 39 of the pressure chamber 7.

Via the gap 37, which is visually accessible from the face side 9, a quality of the connection can preferably be visually checked by determining by visual inspection whether the connecting material has filled this gap 37. This possibility is made accessible in particular by the fact that flow of the liquefied joining material into undesirable areas is prevented by the elevation 35.

The gaps 37 are shown exaggeratedly large in FIG. 2 and also in the following figures in order to better illustrate the principle described herein.

The pressure chamber 7 is preferably widened radially inward in the area of the recess 25, preferably to at least twice the gap width of the hydraulic gap 39.

The recess 25 preferably has, in the axial direction, a first region 41 associated with the collar 15 and a second region 43 associated with the clamping section 13, a width of the recess 25 measured in the radial direction being at least twice as great in the first region 41, preferably twice as great, as in the second region 43.

The transition region 23, in particular the recess 25, has a contour 45 in longitudinal section, which is rounded at least in regions. Preferably, a curvature radius of the contour 45 in the rounded region is at least 0.5 mm, preferably from at least 0.5 mm to at most 2 mm, preferably to at most 1.5 mm.

In the first embodiment example shown here, the contour 45 has a constant curvature radius R throughout.

Figure 2B:
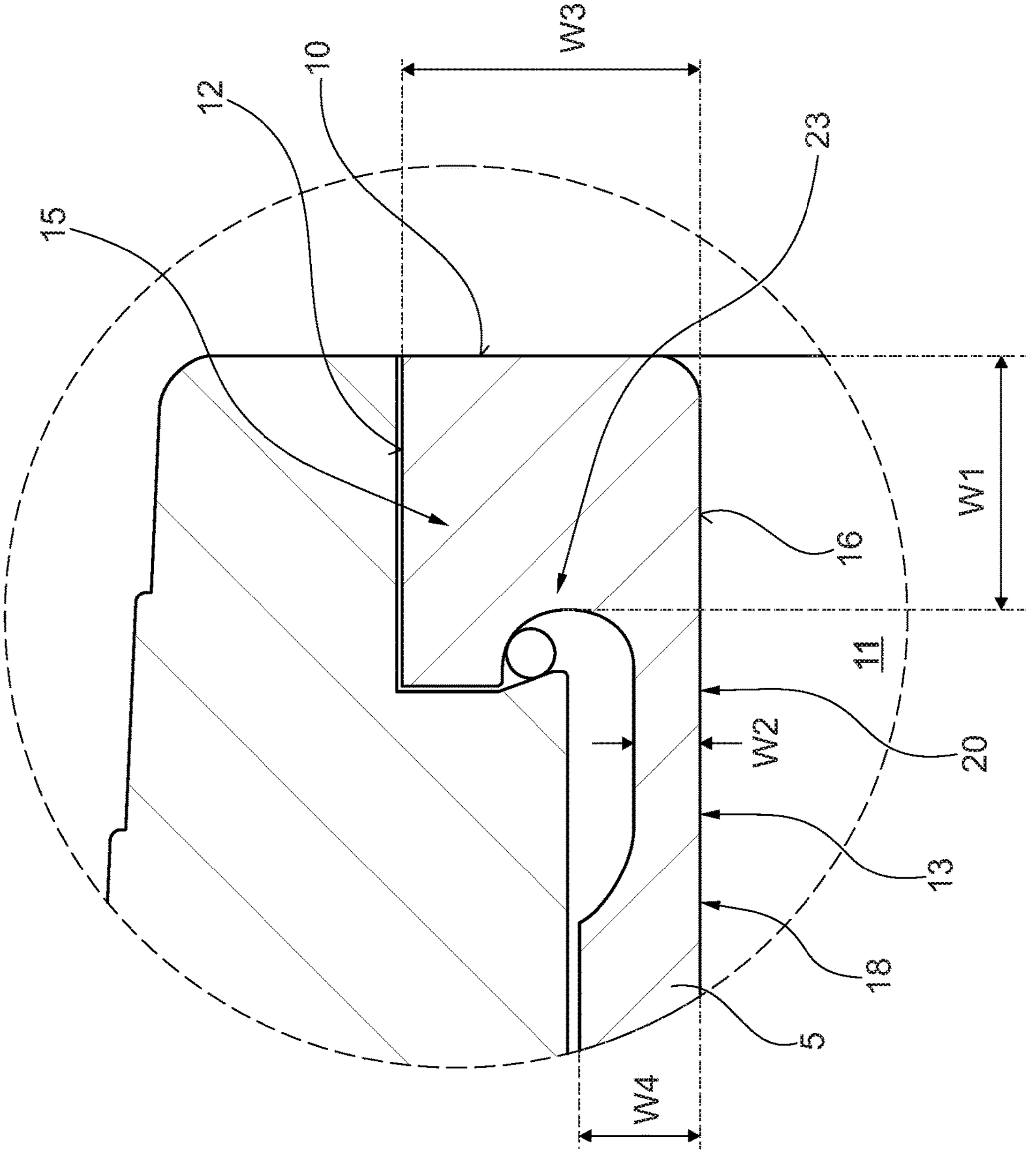

FIG. 2*b* also shows an enlarged representation of the detail marked A in FIG. 1. Preferably, the clamping section 13 has a first partial clamping section 18 and a second partial clamping section 20. In particular, the first partial tensioning section 18 is further away from the face side 10 of the expansion socket 5, as seen in the axial direction, than the second partial tensioning section 20.

Preferably, the expansion socket 5 has a first wall thickness W1 in the transition region 23 that is different from a second wall thickness W2 that the expansion socket has in the second partial clamping section 20. Preferably, the first wall thickness W1 is measured in the axial direction, with the second wall thickness W2 being measured in the radial direction. Preferably, the first wall thickness W1 is greater than the second wall thickness W2, preferably by a factor of at least 3.6 to at most 4.3.

Preferably, the expansion socket 5 has a third wall thickness W3 in the region of the collar 15. Preferably, the third wall thickness W3 is a radial extension between an inner circumferential surface 16 of the receiving space 11 and the outer circumferential surface 12 of the collar 15. Preferably, the third wall thickness W3 is half the difference between a first outer diameter of the outer circumferential surface 12 of the collar 15 and an inner diameter of the inner circumferential surface 16 of the receiving space 11. Preferably, the third wall thickness W3 is different from the second wall thickness W2. Preferably, the third wall thickness W3 is greater than the second wall thickness W2, preferably by a factor of from at least 4.2 to at most 4.8 in the embodiment illustrated herein. In another embodiment not illustrated herein, the factor may be from at least 3.3 to at most 3.9.

Preferably, in the embodiment example shown here, the third wall thickness W3 is greater than the first wall thickness W1. In an embodiment not shown here, the first wall thickness W1 is greater than the third wall thickness W3.

Preferably, the expansion socket 5 has a fourth wall thickness W4 in the first partial clamping section 18. Preferably, the fourth wall thickness W4 is measured in the radial direction. In particular, the fourth wall thickness W4 is different from the second wall thickness W2. Preferably, the fourth wall thickness W4 is greater than the second wall thickness W2, preferably by a factor of at least 1.6 to at most 2.0.

Preferably, the first wall thickness W1 is greater than the fourth wall thickness W4. Preferably, the third wall thickness W3 is greater than the fourth wall thickness W4.

FIG. 3 shows a detailed view of a second embodiment of the Expansion clamping device 1.

The elevation 35 is here spaced from the bearing surface 17. Furthermore, the elevation 35 is formed here as a protrusion 47 projecting in particular perpendicularly to the face side 9.

Furthermore, the elevation 35 is arranged at a radially inner end 49 of the free region 29.

FIG. 4 shows a detailed view of a third embodiment of the expansion clamping device 1. In this third embodiment, the contour 45 has a first section 51, which is associated with the collar 15 and extends from the bearing surface 17 and is straight in the axial direction, and a second section 53, which is associated with the clamping section 13 and is straight in the axial direction, the first section 51 transitioning into the second section 53 via a third section 55.

The third section 55 here has a constant curvature radius R'.

FIG. 5 shows a detailed view of a fourth embodiment example of the expansion clamping device 1. Here, too, the contour 45 has the first section 51, the second section 53 and the third section 55, although in contrast to the third embodiment example according to FIG. 4, in the fourth embodiment example according to FIG. 5 the third section 55 is formed in a straight line in the radial direction, the first section 51 transitioning into the third section 55 via a first curvature radius R1, and the third section 55 transitioning into the second section 53 via a second curvature radius R2.

FIG. 6 shows a detailed view of a fifth embodiment example of the expansion clamping device 1. Here, too, the contour 45 has the first section 51, the second section 53 and the third section 55, although in contrast to the embodiment examples according to FIGS. 4 and 5, in the fifth embodiment example according to FIG. 6 the first section 51 is not formed in a straight line in the axial direction, but rather has a third curvature radius R3 and thus itself transitions directly into the third section 55. This in turn runs in a straight line in the radial direction and transitions into the second section 53 via the second curvature radius R2.

In the fifth embodiment, the elevation 35 is formed as a ramp rising radially inward toward the face side 9 and is additionally spaced from the bearing surface 17—in the radial direction. Furthermore, the elevation 35 is arranged at the radially inner end 49 of the free region 29.

The expansion clamping device 1 is preferably manufactured by inserting the expansion socket 5 into the base body 3 to form the pressure chamber 7. In the free region 29, the connecting element 33, preferably a solder ring, in particular in the form of an O-ring, is arranged on the contact surface 19, and the expansion socket 5 is firmly connected, in particular materially connected, to the base body 3, in particular soldered, preferably brazed, by means of the connecting element 33, in particular the solder ring, at least in the region of the bearing surface 17, preferably in the region of the gaps 37.

For this purpose, the base body 3, the expansion socket 5 and the connecting element 33 are preferably heated, in a particularly preferred embodiment in a furnace.

The invention claimed is:

1. An expansion clamping device comprising:

a base body; and an expansion socket, wherein the expansion socket is inserted into the base body to form a pressure chamber, wherein the pressure chamber is appliable with a hydraulic medium while elastically deforming the expansion socket to achieve a clamping effect in a receiving space which is open in an axial direction of the base body towards a face side and is surrounded by the expansion socket in a circumferential direction, wherein the expansion socket has an elastically deformable clamping section and a collar projecting outwardly in a radial direction on the face side, wherein the expansion socket bears with a bearing surface of the collar in the axial direction the expansion socket bears with a bearing surface of the collar in the axial direction against a contact surface of a contact shoulder of the base body and, at least in a region of the bearing surface, is firmly connected to the base body, wherein the clamping section transitions into the collar in a transition region, a recess being formed in the expansion socket in the transition region such that the transition region overlaps over the contact shoulder of the base body in regions, the bearing surface of the expansion socket bearing against the contact surface in a radially outer contact region thereof, and the contact surface having a radially inner free region adjacent to the contact region, in which free region the expansion socket does not bear against the contact surface, wherein the contact surface in the free region has an elevation, and wherein the free region is arranged at the same axial height as the contact region where it adjoins the contact region.

2. The expansion clamping device according to claim 1, wherein the elevation of the contact surface in the free region is spaced from the bearing surface.

3. The expansion clamping device according to claim 2, wherein the elevation is formed as one of a ramp rising radially inwards towards the face side and a protrusion projecting towards the face side.

4. The expansion clamping device according to claim 3, wherein the protrusion projects perpendicularly towards the face side.

5. The expansion clamping device according to claim 2, wherein the elevation is arranged at a radially inner end of the free region.

6. The expansion clamping device according to claim 1, wherein the pressure chamber is widened radially inwards in a region of the recess.

7. The expansion clamping device according to claim 6, wherein the pressure chamber is widened radially inwards in the region of the recess to at least twice a gap width of a hydraulic gap formed in the clamping section.

8. The expansion clamping device according to claim 1, wherein the recess has, in the axial direction, a first region assigned to the collar and a second region assigned to the clamping section, a width of the recess measured in the radial direction being at least twice as large in the first region as in the second region.

9. The expansion clamping device according to claim 1, wherein the transition region has in longitudinal section a contour which is rounded at least in regions.

10. The expansion clamping device according to claim 9, wherein the contour of the transition region has a constant curvature radius throughout.

11. The expansion clamping device according to claim 9, wherein the contour of the transition region has a first section, which is associated with the collar and extends from the bearing surface and is straight in the axial direction, and a second section, which is associated with the clamping section and is straight in the axial direction, the first section transitioning into the second section via a third section, the third section:

a) having a curvature radius, or b) is rectilinear in the radial direction, the first section transitioning into the third section via a first curvature radius, and the third section transitioning into the second section via a second curvature radius.

12. The expansion clamping device according to claim 11, wherein the contour of the transition region has a first section associated with the collar and extending from the bearing surface and a second section associated with the clamping section and straight in the axial direction, wherein the first section transitions into the second section via a third section, wherein the first section has a third curvature radius, wherein the third section is rectilinear in the radial direction, and wherein the third section transitions into the second section via a second curvature radius.

13. The expansion clamping device according to claim 9, wherein a curvature radius of the contour in the rounded region is at least 0.5 mm.

14. The expansion clamping device according to claim 13, wherein the curvature radius of the contour in the rounded region is from at least 0.5 mm to at most 2 mm.

15. The expansion clamping device according to claim 1, wherein the expansion socket is soldered to the base body at least in the region of the bearing surface.

16. The expansion clamping device according to claim 1, wherein the bearing surface of the collar connected to the base body by a material bond.

17. The expansion clamping device according to claim 1, wherein the elevation in the free region is formed as a convex ramp extending radially inward toward the face side over at least a portion of the free region.

18. The expansion clamping device according to claim 1, wherein the bearing surface of the collar is connected to the base body by a material bond, and the radially inner free region is devoid of any material bond.

19. The expansion clamping device according to claim 1, wherein one end face of the expansion socket and the end face of the base body are substantially radially aligned and at substantially the same axial height.

20. An expansion clamping device comprising:

a base body; and an expansion socket, wherein the expansion socket is inserted into the base body to form a pressure chamber, wherein the pressure chamber is appliable with a hydraulic medium while elastically deforming the expansion socket, in order to achieve a clamping effect in a receiving space which is open in an axial direction of the base body towards a face side and is surrounded by the expansion socket in a circumferential direction, wherein the expansion socket has an elastically deformable clamping section and a collar projecting outwardly in a radial direction on the face side, wherein the expansion socket bears with a bearing surface of the collar in the axial direction against a contact surface of a contact shoulder of the base body and, at least in a region of the bearing surface, is firmly connected to the base body, wherein the clamping section transitions into the collar in a transition region, a recess being formed in the expansion socket in the transition region such that the transition region overlaps over the contact shoulder of the base body in regions, the bearing surface of the expansion socket bearing against the contact surface in a radially outer contact region thereof, and the contact surface having a radially inner free region adjacent to the contact region, in which free region the expansion socket does not bear against the contact surface, and wherein the expansion socket is inserted into the base body such that one end face of the expansion socket and the end face of the base body are radially aligned and at the same axial height.

21. The expansion clamping device according to claim 20, wherein the expansion socket has a first outer diameter of an outer peripheral surface of the collar that is smaller than a second outer diameter of an outer peripheral surface of the base body in the region of the face side of the base body.

22. The expansion clamping device according to claim 20, wherein the clamping section has a first partial clamping section and a second partial clamping section, wherein the first partial clamping section is further away from the face side of the expansion socket than the second partial clamping section, as viewed in the axial direction, wherein the expansion socket has a first wall thickness in the transition region that is different from a second wall thickness that the expansion socket has in the second partial clamping section, wherein the first wall thickness is measured in the axial direction, with the second wall thickness being measured in the radial direction.

23. The expansion clamping device according to claim 22, wherein the expansion socket has a third wall thickness in the region of the collar, wherein the third wall thickness is a radial extension between an inner peripheral surface of the receiving space and an outer peripheral surface of the collar, wherein the third wall thickness is greater than the second wall thickness.

* * * * *